US011599531B2

(12) United States Patent
Faust et al.

(10) Patent No.: US 11,599,531 B2
(45) Date of Patent: Mar. 7, 2023

(54) COMPACT SPARSE COLUMN GROUPS

(71) Applicant: eBay Inc., San Jose, CA (US)

(72) Inventors: Francisco Jose Claude Faust, San Jose, CA (US); Alberto Ordonez-Pereira, Santa Clara, CA (US)

(73) Assignee: eBay Inc., San Jose, CA (US)

( * ) Notice: Subject to any disclaimer, the term of this patent is extended or adjusted under 35 U.S.C. 154(b) by 234 days.

(21) Appl. No.: 16/585,875

(22) Filed: Sep. 27, 2019

(65) Prior Publication Data

US 2021/0097064 A1    Apr. 1, 2021

(51) Int. Cl.
*G06F 16/242* (2019.01)
*G06F 16/22* (2019.01)
*G06F 16/248* (2019.01)

(52) U.S. Cl.
CPC ........ *G06F 16/242* (2019.01); *G06F 16/2237* (2019.01); *G06F 16/2246* (2019.01); *G06F 16/248* (2019.01)

(58) Field of Classification Search
None
See application file for complete search history.

(56) References Cited

U.S. PATENT DOCUMENTS

| | | | |
|---|---|---|---|
| 5,799,310 A | 8/1998 | Anderson et al. | |
| 2010/0106734 A1* | 4/2010 | Calder | G06F 16/93 |
| | | | 707/758 |
| 2015/0106382 A1* | 4/2015 | Liu | G06F 16/2282 |
| | | | 707/744 |
| 2017/0364560 A1* | 12/2017 | Yi | G06F 16/24556 |
| 2018/0307758 A1 | 10/2018 | Reiser | |
| 2019/0213658 A1* | 7/2019 | Bhattacherjee | G06Q 20/12 |

OTHER PUBLICATIONS

Lemire et al., "Upscaledb: Efficient Integer-Key Compression in a Key-Value Store using SIMD Instructions", 2017 (Year: 2017).*
Ordóñez et al., Grammar compressed sequences with rank/select support, 2016 (Year: 2016).*
O'Neil et al., "ORDPATHs: Insert-Friendly XML Node Labels", 2004 (Year: 2004).*

(Continued)

*Primary Examiner* — Dawaune A Conyers
(74) *Attorney, Agent, or Firm* — Holland & Hart LLP (57) ABSTRACT

Methods and systems for improving memory utilization and access speed of database indexes are disclosed. A representation of attributes of items listed on a network-based publication system is identified. The representation includes a plurality of lists of the attributes as a sequence of serialized attributes, each of which stores an attribute identifier (ID) and data corresponding to the attribute identifier. A compact or compressed structure is used to represent the attribute IDs. This representation allows a reader application to quickly determine whether an attribute ID is present in the lists or not. Directly-addressable variable-length codes (DACs) are used, in an unconventional manner, to represent the data. By representing the data in this way, the index takes up less memory for certain types of data and the reader application is able to gain faster access to the index.

17 Claims, 9 Drawing Sheets

(56) References Cited

OTHER PUBLICATIONS

Brisaboa et al., "Directly Addressable Variable-Length Codes", String Processing and Information Retrieval (SPIR), Aug. 2009, DOI: 10.1007/978-3-642-03784-9_12, 9 pages.
Claude et al., "The wavelet matrix: An efficient wavelet treefor large alphabets", Information Systems, vol. 47 (2015), Elsevier, 18 pages.
Witten et al., "Managing Gigabytes: Compressing and Indexing Documents and Images", Morgan Kaufmann Series in Multimedia Information and Systems Morgan Kaufmann, 2nd Edition, 1999, ISBN 1558605703, 2 pages.

* cited by examiner

| a | a | a | a | b | b | b | c |

*FIG. 8A*

| a | b | c | a | b | a | b | a |

*FIG. 8B*

| a | b | c | a | b | a | b | a |
|---|---|---|---|---|---|---|---|
| 1 | 1 | 0 | 1 | 1 | 1 | 0 | 0 |

COMPACT SPARSE COLUMN GROUPS

TECHNICAL FIELD

The present application relates generally to the technical field of database search index generation and usage, and, in one specific example, to representing data fields within a database index such that the size of the index is reduced in some circumstances and such that a reader can not only interpret the data included in the index properly, but also access the index more quickly.

BACKGROUND

A network-based publication system, such as eBay, Amazon.com, or Craigslist, may feature listings of items (e.g., goods or services). The listings may be posted by a member of the network-based publication system (e.g., a seller) and surfaced via one or more user interfaces to other members or users of the network-based publication system (e.g., potential buyers). It can be a technical challenge to generate a search index for a database of items listed on the network-based publication system that allows for low-latency searching of the items, such as for responding to search queries that specify one or more values of one or more attributes of the items.

BRIEF DESCRIPTION OF THE DRAWINGS

Some embodiments are illustrated by way of example and not limitation in the figures of the accompanying drawings.

DETAILED DESCRIPTION

In the following description, for purposes of explanation, numerous specific details are set forth in order to provide an understanding of various embodiments of the present subject matter. It will be evident, however, to those skilled in the art that various embodiments may be practiced without these specific details.

Consider a database in which a large number of listings of items are stored. A search index for this database may represent a sparse list of attributes of the items (e.g., as key-value pairs) in various ways. For example, the search index may split the attributes into multiple lists using a hash function. Where possible, each list may be encoded (e.g., using VByte values); otherwise, plain values may be used. Each list may be laid out contiguously in memory. The lists of attributes may be a sequence of serialized attributes. For each attribute, the serialization stores (1) an attribute ID and (2) data. The attribute IDs may be VByte-encoded. The data may contain the information itself and the length of the information such that a reader can determine how much data to read. Each attribute ID may be associated with a fixed type for its corresponding data or the data may simply be limited to byte blobs such that a reader is responsible for interpreting the data.

This representation of the sparse list of attributes in the search index not only requires a considerable memory footprint, but also is inefficient to access. As explained in more detail below, the disclosed operations not only reduce the memory footprint of the search index, at least under some conditions, but also provide for more efficient access to the search index.

Methods and systems for improving a database search index are disclosed. A representation of attributes of items listed on a network-based publication system is identified. The representation includes a plurality of lists of the attributes as a sequence of serialized attributes, each of which stores an attribute identifier (ID) (e.g., VByte-encoded) and data (e.g., a blob of bytes) corresponding to the attribute identifier. A compact or compressed structure, such as a wavelet matrix, is used to represent the attribute IDs. This representation allows a reader application to quickly determine whether an attribute ID is present in the lists or not. Directly-addressable variable-length codes (DACs) are used, in an unconventional manner, to represent the data. By representing the attribute identifiers and their corresponding data items in this way, the index takes up less memory for certain types of data (e.g., because each data item does not include length information for the data item) and the reader application is able to gain faster access to the index (e.g., because sampling is not needed for random access).

In example embodiments, a method of improving searching of a database is disclosed. A search query is received from a client device. The search query specifies a value of an attribute of an item listed on a network-based publication system. A database of items listed on the network-based publication system is searched. The searching includes accessing a search index for the database. The accessing of the search index includes accessing a first data representation. The first data representation represents attribute identifiers corresponding to the attributes that are present in the index. Based on the accessing of the first data representation indicating that an attribute identifier corresponding to an attribute specified in the search query is present in the index, a second data representation is accessed. The second data representation represents a blob of data corresponding to the attribute identifier. A result for the search query is generated based on an accessing of the database via the search index. The result is communicated to the client device for presentation in response to the search query.

In example embodiments, a method of representing attribute identifiers is disclosed. A compact or compressed structure is used to represent attribute identifiers included in a list. The structure allows a reader to determine in logarithmic time whether an attribute identifier is present in the list or not. Additionally, the structure allows the reader to determine, within the same time, a position of a data element (e.g., a byte of a set of bytes corresponding to the data element) corresponding to the attribute identifier in a byte blob corresponding to the attribute identifier. In example embodiments, the structure is any structure that supports checking for existence and finding single symbols for any given range in sub-linear time, such as wavelet trees, wavelet matrices, alphabet partitioning, and so on.

In example embodiments, a method of representing data (e.g., in a byte blob corresponding to an attribute identifier) is disclosed. Instead of representing data elements (e.g., values corresponding to attribute identifiers) in a byte blob in a contiguous and/or sequential manner, the bytes comprising the data elements are rotated and represented using DACs. For example, consider a byte blob that includes three data elements—a four-byte data element (e.g., "aaaa,"), a three-byte data element (e.g., "bbb"), and a one-byte data element ("c"). Instead of representing these data elements in a byte blob in a contiguous sequential order (e.g., "aaaabbbc"), the bytes of the data elements are re-ordered to list first the first byte (or character) of each data element, then the second byte of each data element, and so on (e.g., "abcababa"). In example embodiments, this re-ordered list of data elements is stored as an array of bytes, which is included in a table. The table is augmented with continuation bits. These continuation bits determine whether there are more bytes or not for each data element.

In example embodiments, a method of representing a plurality of data elements in a byte blob is disclosed. A representation of a first set of bytes of the plurality of bytes and a second set of the plurality of bytes is generated. The generating of the representation includes generating an array of bytes. The generating of the array of bytes includes placing a first byte of the first set of bytes at a first position in the array and placing a first byte of the second set of bytes at a second position in the array, the first position being adjacent to the second position. The array of bytes is included in a table. The table is augmented with a first continuation bit and a second continuation bit. The first continuation bit indicates whether the first byte of the first set of bytes is a last byte of the first set of bytes. The second continuation bit indicates whether the first byte of the second set of bytes is a last byte of the second set of bytes. The representation of the first set of bytes and the second set of bytes is provided for access by a reader application.

In example embodiments, a method of accessing data elements in a byte blob (e.g., using a reader application) is disclosed. A first data element within the byte blob is accessed (e.g., for reading). A position of a first byte of the first data element (e.g., in an array of bytes included in the byte blob) is determined. The first byte of the first data element is accessed at the determined position. A continuation bit associated with the first byte is accessed (e.g., from a table that includes the array of bytes and a set of associated continuation bits for each byte) to determine whether the first byte is the last byte of the first data element. Based on the continuation bit indicating that the first byte is not the last byte of the first data element, a second byte of the first data element is accessed. In example embodiments, the navigation is defined by the DACs proposal. However, unlike conventional use of DACs (e.g., for representing integers as VByte encodings), data elements included within the byte blob, such as the first data element discussed above, can be as long as needed to accommodate other data types, such as strings. Furthermore, unlike the traditional use of DACs (e.g., for compression), DACs are being used for random access on a set of blobs. Because of this distinction, the accessing of data elements in a byte blob disclosed herein, while being space conscious, does not compress.

Also, based on the manner in which bytes are represented in the byte blob, the length of strings does not need to be included, which saves space for strings that are short.

In example embodiments, for each byte represented in a sequence (e.g., in a data element), one extra bit is spent. In practice, because on how the navigation works, this may result in a 5% overhead over each extra bit. So, in example embodiments, the final result is that to represent 8n bits (i.e., n bytes), 9.05 bits total bits are needed, which is a 13.125% overhead. While perhaps not especially interesting for integers, it is important to realize that VByte adds a 12.5% overhead over the plain representation, and that to represent strings we usually need to include its length. The disclose method of representation does not require this and, in fact, saves space for string that are short (e.g., for compact sparse column groups, such as those corresponding to lists of attributes of items stored in a search index).

These methods and various operations disclosed herein may be implemented as a computer system having one or more modules (e.g., hardware modules or software modules) that are specially designed and incorporated into the computer system to perform this method or one or more of the operations described herein. These methods and various operations disclosed herein may be embodied as instructions stored on a machine-readable medium that, when executed by a machine, cause the machine to perform the method or one or more of the various operations.

These methods and various operations disclosed herein provide specific improvements over prior art systems, including, for example, improving the speed at which a reader accesses a database index and, under certain conditions, reducing the size of the database index (and thus the amount of memory needed to store it). In addition, an ability of a reader to interpret the data included in the database index is improved.

Figure 1:
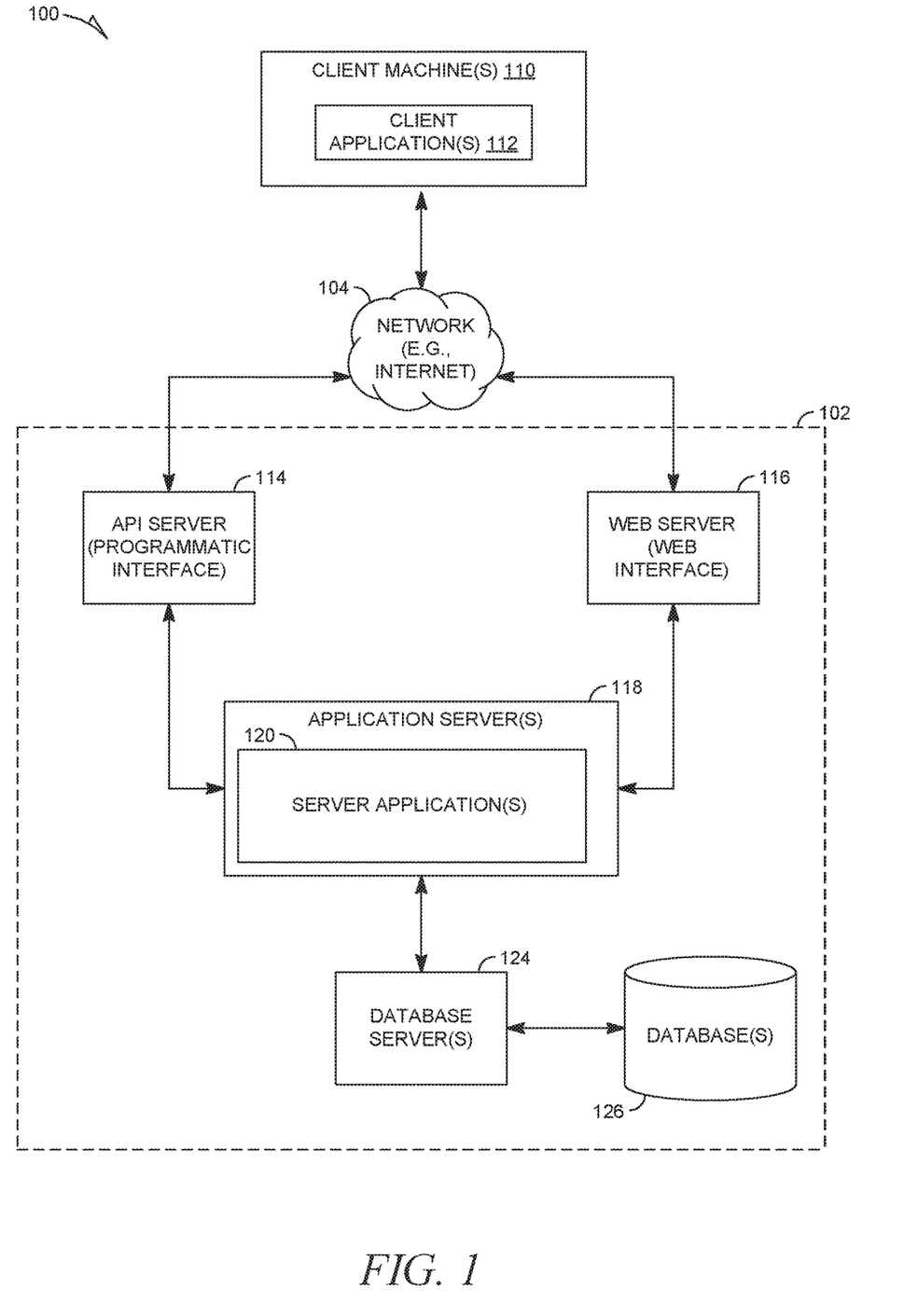
FIG. 1 is a network diagram depicting a client-server system within which various example embodiments may be deployed.

FIG. 1 is a network diagram depicting a system 100 within which various example embodiments may be deployed. A networked system 102, in the example forms of a network-based marketplace or other publication system, provides server-side functionality, via a network 104 (e.g., the Internet or Wide Area Network (WAN)) to one or more clients machines 110. FIG. 1 illustrates client application(s) 112 on the client machines 110. Examples of client application(s) 112 may include a web browser application, such as the Internet Explorer browser developed by Microsoft Corporation of Redmond, Wash. or other application supported by an operating system of the device, such as Windows, iOS or Android operating systems. Each of the client application(s) 112 may include a software application module (e.g., a plug-in, add-in, or macro) that adds a specific service or feature to a larger system.

An API server 114 and a web server 116 are coupled to, and provide programmatic and web interfaces respectively to, one or more application servers 118. The application servers 118 host one or more server application(s) 120. The application servers 118 are, in turn, shown to be coupled to one or more database servers 124 that facilitate access to one or more databases 126 or data stores, such as NoSQL or non-relational data stores.

The server applications 120 may provide a number of marketplace functions and services to users that access the networked system 102. While the server applications 120 are shown in FIG. 1 to form part of the networked system 102, in alternative embodiments, the various server applications 120 may form part of a service that is separate and distinct from the networked system 102.

Further, while the system 100 shown in FIG. 1 employs a client-server architecture, various embodiments are, of course, not limited to such an architecture, and could equally well find application in a distributed, or peer-to-peer, architecture system, for example. The various server applications 120 could also be implemented as standalone software programs, which do not necessarily have networking capabilities. Additionally, although FIG. 1 depicts client machines 110 as being coupled to a single networked system 102, it will be readily apparent to one skilled in the art that client machines 110, as well as client applications 112, may be coupled to multiple networked systems, such as payment applications associated with multiple payment processors or acquiring banks (e.g., PayPal, Visa, MasterCard, and American Express).

Web applications executing on the client machine(s) 110 may access the various server applications 120 via the web interface supported by the web server 116. Similarly, native applications executing on the client machine(s) 110 may accesses the various services and functions provided by the server applications 120 via the programmatic interface provided by the API server 114. An example of one of the client application(s) 112 may be a seller application (e.g., the TurboLister application developed by eBay Inc., of San Jose, Calif.) that enables sellers to author and manage listings on the networked system 102 in an off-line manner, and to perform batch-mode communications between the client application(s) 112 and the networked system 102. Other examples of client application(s) 112 may be third-party applications. For example, the third-party applications may, utilizing information retrieved from the networked system 102, support one or more features or functions on a website hosted by the third party. The third-party website may, for example, provide one or more promotional, marketplace or payment functions that are supported by the relevant applications of the networked system 102.

Figure 2:
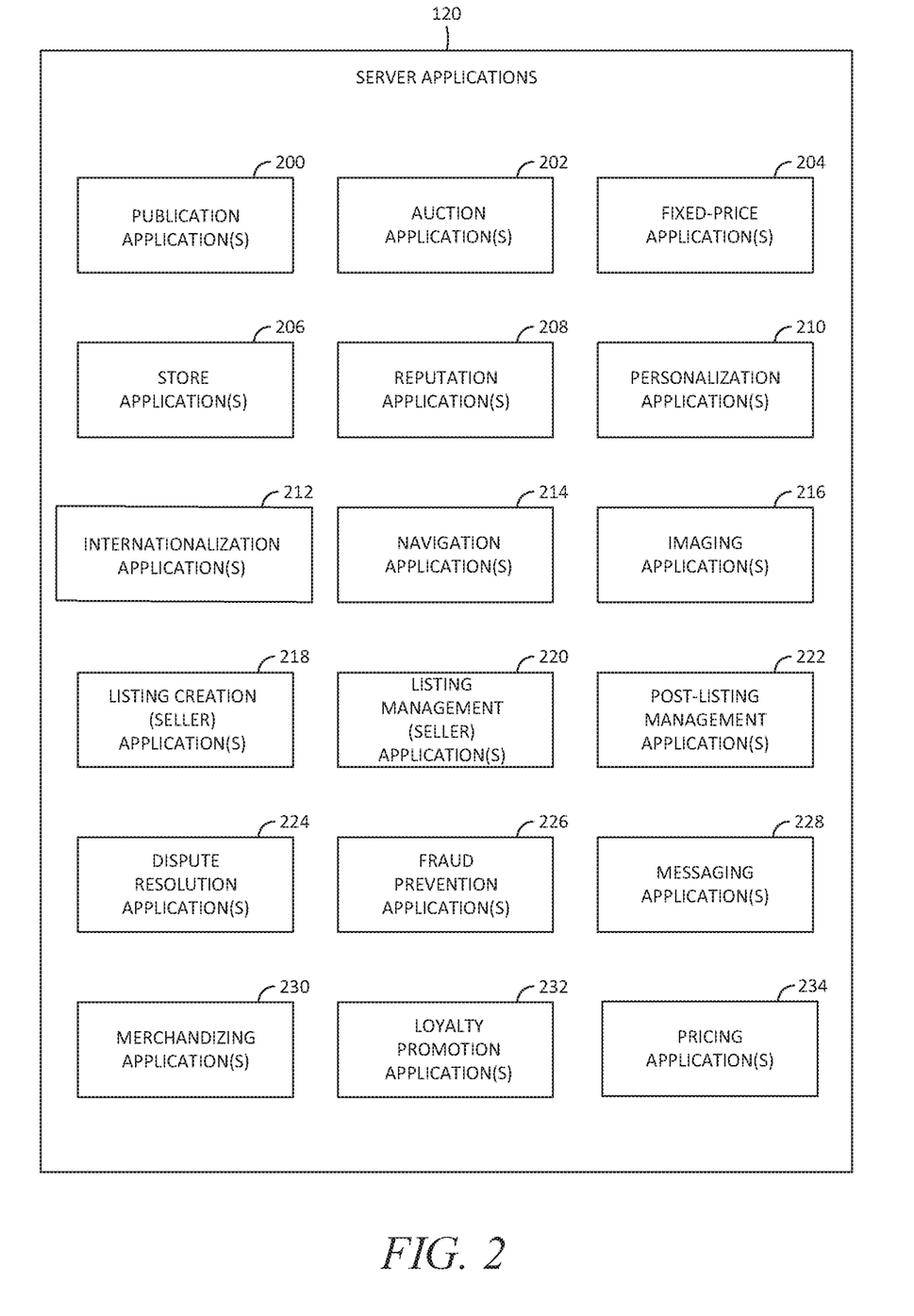
FIG. 2 is a block diagram illustrating multiple server applications that, in various example embodiments, are provided as part of the networked system of FIG. 1.

FIG. 2 is a block diagram illustrating multiple server applications 120 that, in various example embodiments, are provided as part of the networked system 102. The server applications 120 may be hosted on dedicated or shared server machines (not shown) that are communicatively coupled to enable communications between server machines. The server applications 120 themselves are communicatively coupled (e.g., via appropriate interfaces) to each other and to various data sources, so as to allow information to be passed between the server applications 120 so as to allow the server applications 120 to share and access common data. The server applications 120 may furthermore access one or more databases 126 via the database servers 124.

The networked system 102 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the server applications 120 are shown to include at least one publication application 200 and one or more auction applications 202 which support auction-format listing and price setting mechanisms (e.g., English, Dutch, Vickrey, Chinese, Double, Reverse auctions). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives and features that are specific and personalized to a relevant seller.

Reputation applications 208 allow users that transact, utilizing the networked system 102, to establish, build and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user (e.g., through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. For instance, a version of the networked system 102 may be customized for the United Kingdom, whereas another version of the networked system 102 may be customized for the United States. Each of these versions may operate as an independent marketplace, or may be customized (or internationalized) presentations of a common underlying marketplace. The networked system 102 may accordingly include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application) may enable keyword searches of listings published via the networked system 102. A browse application may allow users to browse various category, catalogue, or inventory data structures according to which listings may be classified within the networked system 102. Various other navigation applications may be provided to supplement the search and browsing applications.

In order to make listings available via the networked system 102 as visually informing and attractive as possible, the server applications 120 may include one or more imaging applications 216, which users may utilize to upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular or predetermined seller has authored and/or published a large number of listings, the management of such listings may present a challenge. The listing management applications 220 provide a number of features (e.g., auto-relisting, inventory level monitors) to assist the seller in managing such listings. The listing creation application 218 and listing management applications 220 may allow sellers to manage listing in bulk (e.g., in a single operation, such as by an uploading of a file) and provide templates for sellers to manage category-specific, vendor-specific, or general-type-specific (e.g., catalog or ticket) listings. One or more post-listing management applications 222 also assist sellers with a number of activities that typically occur post-listing. For example, upon completion of an auction facilitated by one or more auction applications 202, a seller may wish to leave feedback regarding a particular or predetermined buyer. To this end, a post-listing management application 222 may provide an interface to one or more reputation applications 208, so as to allow the seller to conveniently provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of operations in an attempt to settle a dispute. In the event that the dispute cannot be settled via the guided procedures, the dispute may be escalated to a third-party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102. These messages may, for example, advise users regarding the status of listings at the networked system 102 (e.g., providing "outbid" notices to bidders during an auction process or providing promotional and merchandising information to users). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotion applications 232. For example, a buyer may earn loyalty or promotions points for each transaction established and/or concluded with a particular or predetermined seller, and may be offered a reward for which accumulated loyalty points can be redeemed.

Pricing application(s) 234 may include one or more applications for enhancing a listing user interface (e.g., for one or more of the listing creation applications 218, listing management applications 220, or post-listing management applications 222) with one or more user elements for researching, specifying, or selecting a listing price for an item, as described in more detail below.

Figure 3:
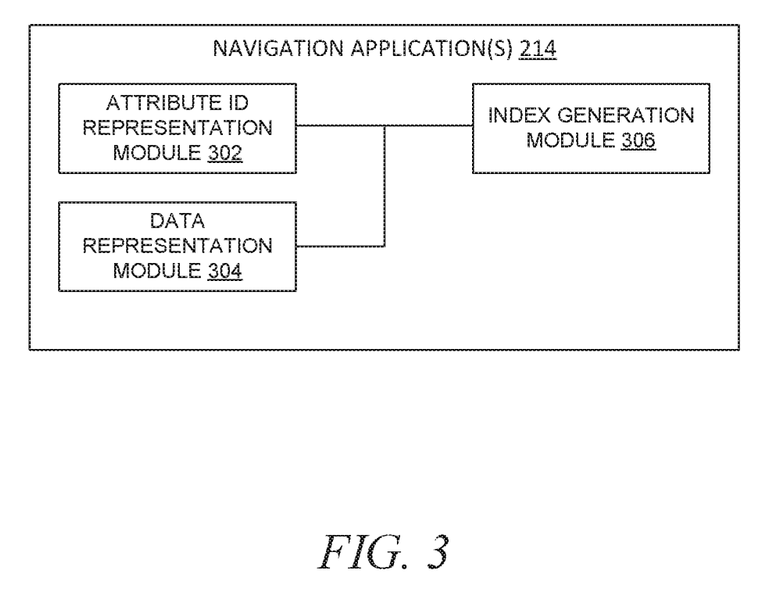
FIG. 3 is a block diagram illustrating example modules of the navigation application(s) of FIG. 2.

FIG. 3 is a block diagram illustrating example modules of the navigation application(s) 214. An attribute ID representation module 302 is configured to represent attribute identifiers corresponding to items listed on the network-based publication system (e.g., using a compact or compressed structure, such as a wavelet matrix) for inclusion in a search index. A data representation module 304 is configured to represent data items corresponding to the attribute identifiers using rotation of the byte blobs and using DACs in an unconventional manner, as described in more detail below, for inclusion in the search index. An index generation module 306 is configured to generate a search index for a database using the attribute ID representation module 302 and the data representation module 304 and to facilitate access by a reader application to the search index and corresponding database of items listed on the network-based publication system.

Figure 4:
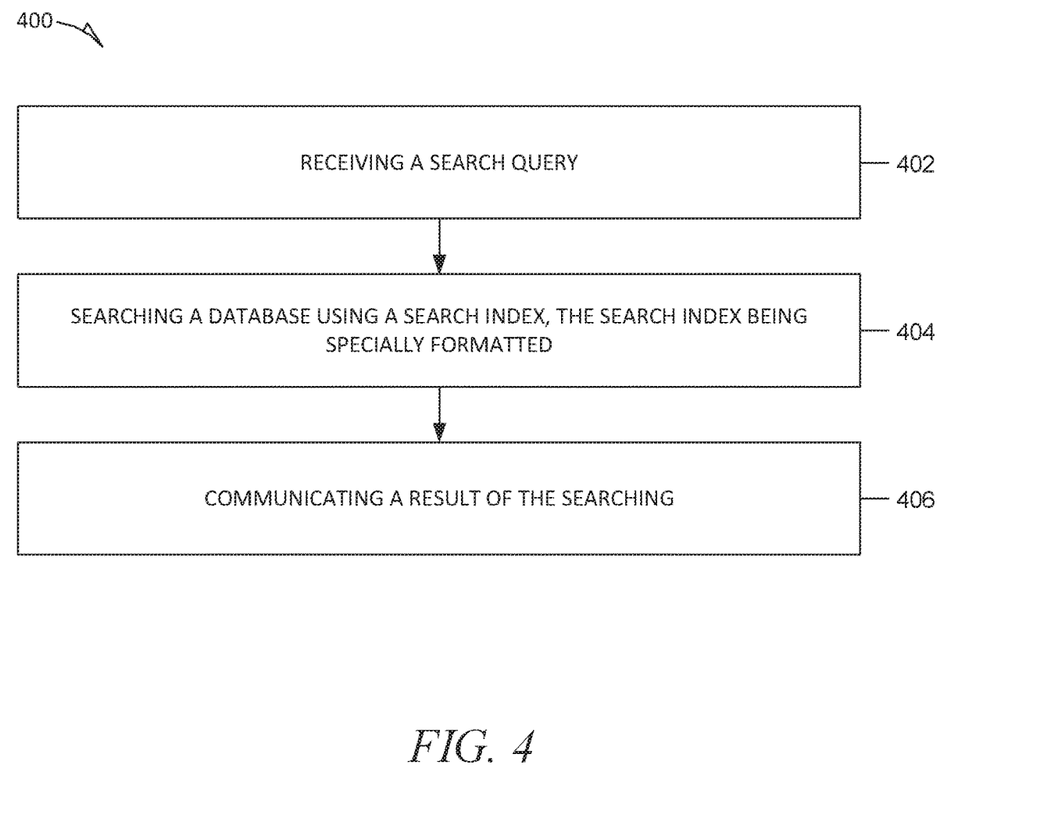
FIG. 4 is a flowchart illustrating example operations of a method of generating an improved search index.

FIG. 4 is a flowchart illustrating example operations of a method 400 of generating an improved search index (e.g., for a database of items listed on a network-based publication system). In example embodiments, the operations may be performed by one or more modules of the navigation application(s) 214.

At operation 402, a search query is received (e.g., from a client device). In example embodiments, the search query pertains to a compact sparse column group, such as a value of an attribute of an item that has been listed and included in a database of a network-based publication system.

At operation 404, a database is searched, such as a database of items listed on the network-based publication system. The searching includes accessing a search index for the database. The search index has been specially-formatted to represent attribute identifiers and corresponding data such that a memory footprint of the search index is reduced or access is more efficient than a conventional index, as described herein. The accessing of the search index includes accessing a first data representation. The first data representation represents attribute identifiers corresponding to the attributes that are present in the index (e.g., in a compact or compressed structure, such as a wavelet matrix). Based on the accessing of the first data representation indicating that an attribute identifier corresponding to an attribute specified in the search query is present in the index, a second data representation is accessed. The second data representation represents a blob of data corresponding to the attribute identifier (e.g., using DACs in an unconventional manner, as described herein). A result for the search query is generated based on an accessing of the database via the search index.

At operation 406, the result of the searching of the database is communicated to the client device for presentation in response to the search query.

Figure 5:
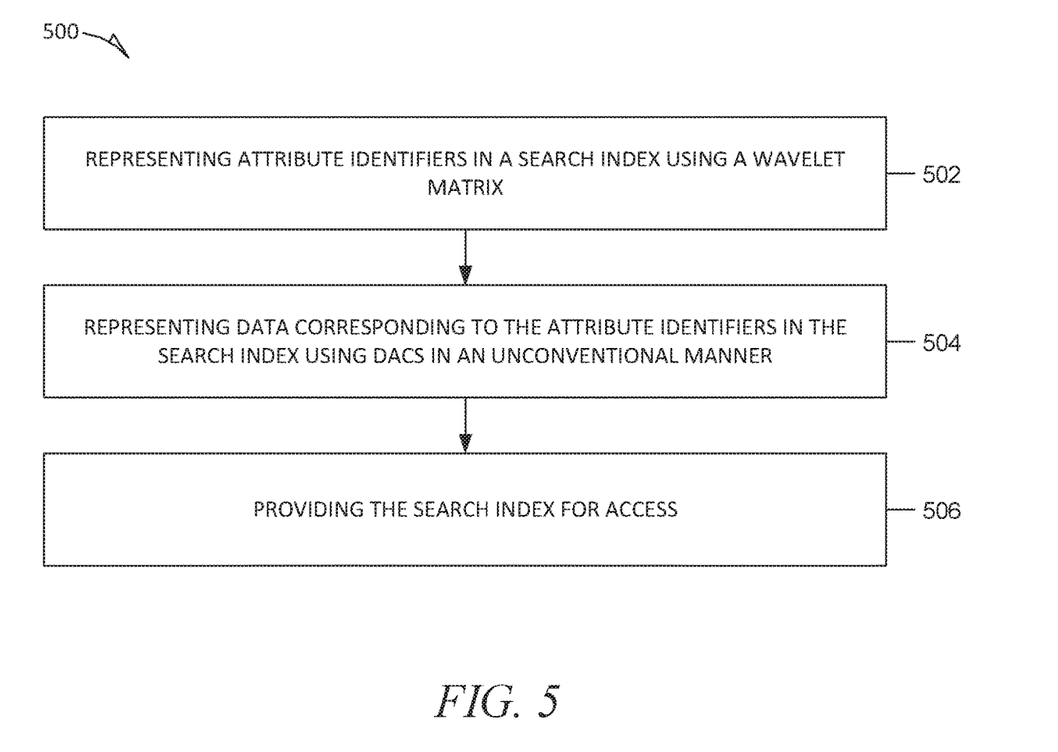
FIG. 5 is a flowchart illustrating an example method of generating a specially-formatted search index.

FIG. 5 is a flowchart illustrating an example method 500 of generating a specially-formatted search index. In example embodiments, the operations may be performed by one or more modules of the navigation application(s) 214.

At operation 502, a compact or compressed structure is used to represent attribute identifiers included in a list. For example, a wavelet matrix allows a reader to determine, in logarithmic time, whether an attribute identifier is present in the list or not. Additionally, the wavelet matrix allows the reader to determine, within the same time, a position of a data element (e.g., a byte of a set of bytes corresponding to the data element) corresponding to the attribute identifier in a byte blob corresponding to the attribute identifier.

At operation 504, DACs are used in an unconventional manner to represent data corresponding to the attribute identifiers. Instead of representing data elements (e.g., values corresponding to attribute identifiers) in a byte blob in a contiguous and/or sequential manner, the bytes comprising the data elements are rotated and represented using DACs. For example, consider a byte blob that includes three data elements a four-byte data element (e.g., "aaaa,") a three-byte data element (e.g., "bbb"), and a one-byte data element ("c"). Instead of representing these data elements in a byte blob in a contiguous sequential order (e.g., "aaaabbbc"), the bytes of the data elements are re-ordered to list first the first byte (or character) of each data element, then the second byte of each data element, and so on (e.g., "abcababa"). In example embodiments, this re-ordered list of data elements is stored as an array of bytes, which is included in a table. The table is augmented with continuation bits. These continuation bits determine whether or not there are more bytes for each data element. Unlike conventional use of DACs (e.g., for representing integers as VByte encodings), data elements included within the byte blob, can be as long as needed to accommodate other data types, such as strings. Furthermore, unlike the traditional use of DACs (e.g., for compression), DACs are being used for random access on a set of blobs. Because of this distinction, the disclosed operations for representing data, while being space conscious, does not compress. Also, based on the manner in which bytes are represented in the byte blob, the length of strings does not need to be included, which saves space for strings that are short.

In example embodiments, for each byte represented in a sequence (e.g., in a data element), one extra bit is spent. In practice, because of how the navigation works, this may result in a 5% overhead over each extra bit. So, in example embodiments, the final result is that to represent 8n bits (i.e., n bytes), 9.05 bits total bits are needed, which is a 13.125% overhead. While perhaps not especially interesting for integers, it is important to realize that VByte adds a 12.5% overhead over the plain representation, and that to represent strings we usually need to include its length. The disclose method of representation does not require this and, in fact, saves space for strings that are short (e.g., for compact sparse column groups, such as those corresponding to lists of attributes of items stored in a search index).

At operation 506, the representations of the attribute IDs and the representations of the data corresponding to the attribute IDs are provided for use (e.g., by a reader application) (e.g., in fields of a search index that is generated and provided for accessing a database).

Figure 6:
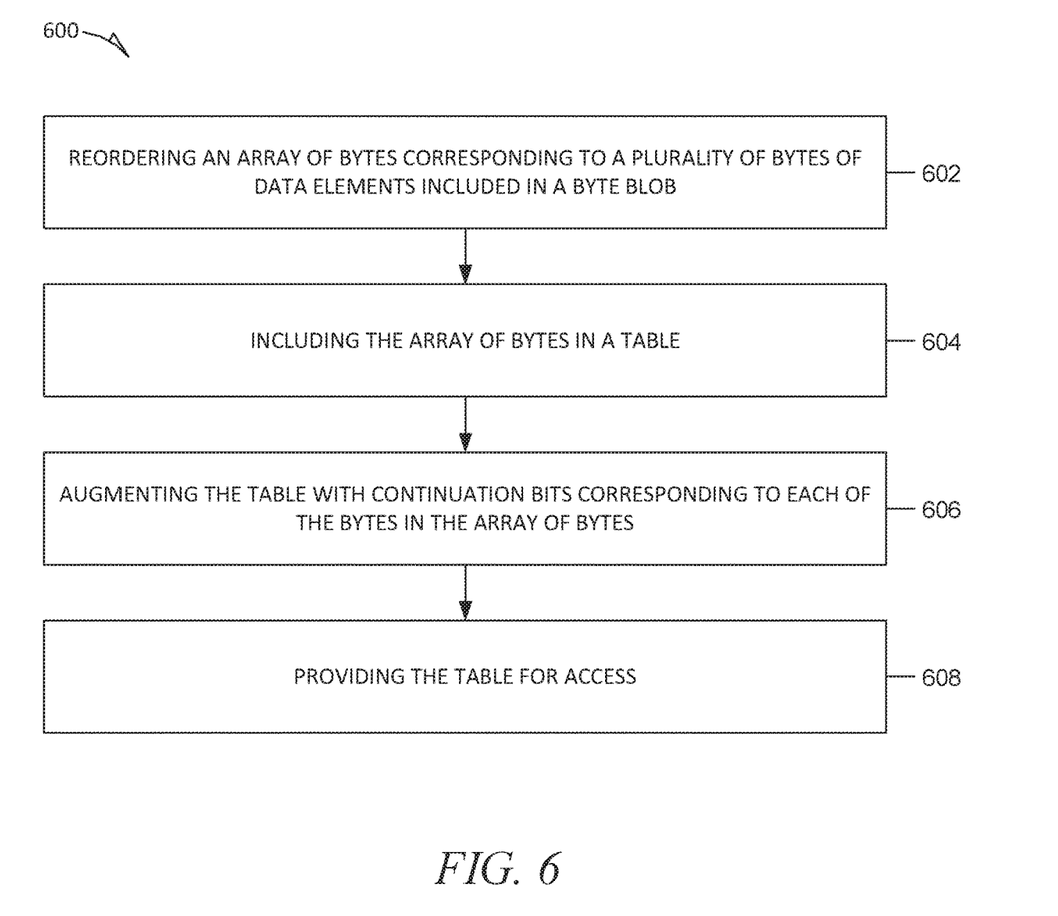
FIG. 6 is a flowchart illustrating an example method of representing data in a byte blob.

FIG. 6 is a flowchart illustrating an example method 600 of representing data in a byte blob. In example embodiments, the operations may be performed by one or more modules of the navigation application(s) 214.

At operation 602, an array of bytes corresponding to a plurality of bytes of data elements included in the byte blob are reordered in comparison to a standard order, such as a sequential, contiguous order (e.g., as described above). For example, generating of the array of bytes includes placing a first byte of the first set of bytes (e.g., corresponding to a first data element) at a first position in the array and placing a first byte of the second set of bytes (e.g., corresponding to a second data element) at a second position in the array, the first position being adjacent to the second position.

At operation 604, the array of bytes is included in a table.

At operation 606, the table is augmented with a set of continuation bits. For example, the table is augmented with a first continuation bit and a second continuation bit. The first continuation bit may indicate whether the first byte of the first set of bytes is a last byte of the first set of bytes. The second continuation bit may indicate whether the first byte of the second set of bytes is a last byte of the second set of bytes.

At operation 608, the table is provided for access (e.g., by a reader application) (e.g., as a field of a search index).

Figure 7:
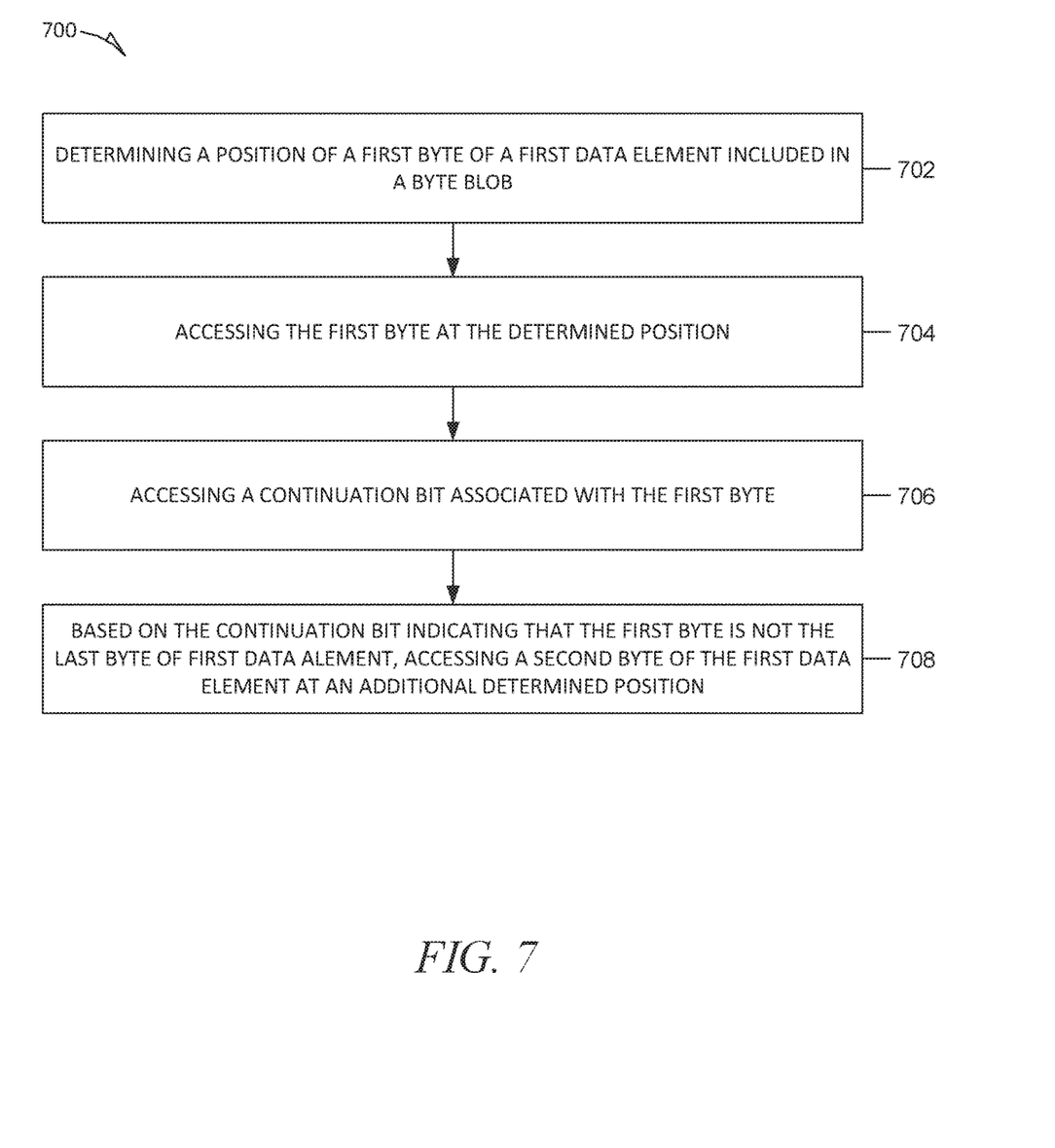
FIG. 7 is a flowchart illustrating an example method of accessing data elements in a byte blob.

FIG. 7 is a flowchart illustrating an example method 700 of accessing data elements in a byte blob (e.g., using a reader application). In example embodiments, the operations may be performed by one or more modules of the navigation application(s) 214.

At operation 702, a position of a first byte of a first data element (e.g., in an array of bytes included in a byte blob) is determined. For example, the position may be obtained by accessing an attribute identifier corresponding to the identifier from a compact or compressed structure representing attribute identifiers that are present.

At operation 704, the first byte of the first data element is accessed at the determined position.

At operation 706, a continuation bit associated with the first byte is accessed (e.g., from a table that includes the array of bytes and a set of associated continuation bits for each byte) to determine whether the first byte is the last byte of the first data element.

At operation 708, based on the continuation bit indicating that the first byte is not the last byte of the first data element, a second byte of the first data element is accessed. In example embodiments, the navigation is defined by the DACs proposal. However, the overall usage of DACs is unconventional, as explained herein.

Figure 8A:
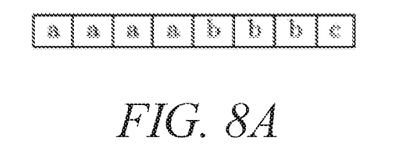
FIGS. 8A-8C are diagrams depicting a reordering of bytes corresponding to data elements in an array of bytes in a byte blob, an inclusion of the array of bytes in a table, and an augmenting of the table with continuation bits.

FIG. 8A is a diagram depicting a usual way of representing a plurality of data elements in memory. Here, three data elements are depicted: "aaaa", "bbb", and "c".

Figure 8B:
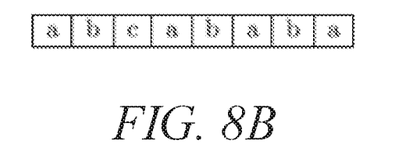

FIG. 8B is a diagram depicting a re-ordering of the bytes corresponding to the three data elements of FIG. 8A. Here, the first byte (or character) of each element of data is listed, then the second byte, and so on, such that the bytes are ordered in memory (e.g., in an array of bytes of a byte blob) as follows: "abcababa".

Figure 8C:
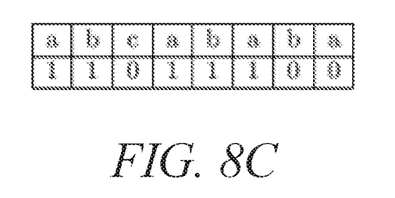

FIG. 8C is a diagram depicting the inclusion of the reordered bytes of FIG. 8B in a table and the augmenting of the table with continuation bits corresponding to each of the reordered bytes.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 9:
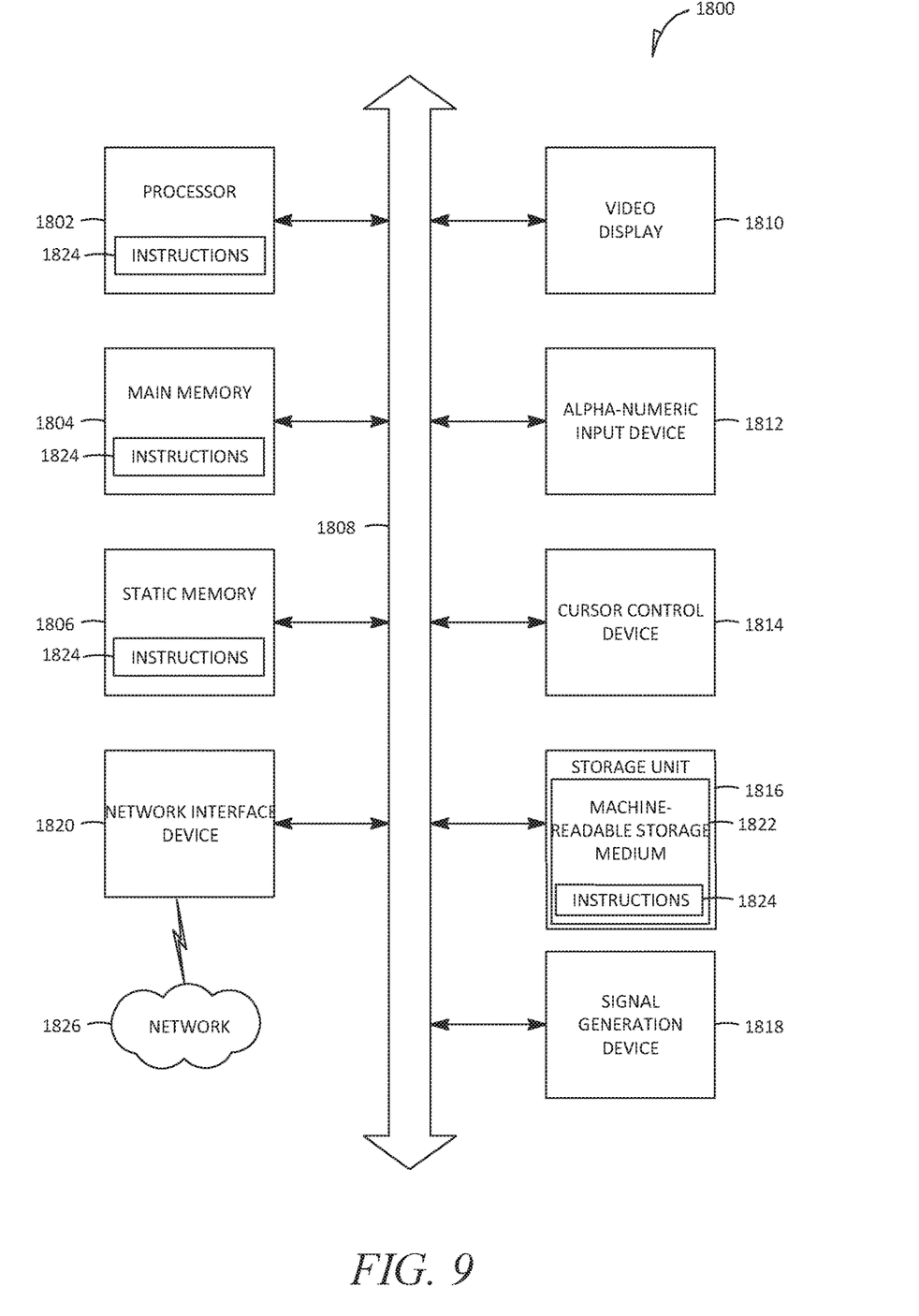
FIG. 9 is a block diagram of machine in the example form of a computer system within which instructions for causing the machine to perform any one or more of the methodologies discussed herein may be executed.

FIG. 9 is a block diagram of machine in the example form of a computer system 1800 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1800 includes a processor 1802 (e.g., a central processing unit (CPU), a graphics processing unit (GPU) or both), a main memory 1804 and a static memory 1806, which communicate with each other via a bus 1808. The computer system 1800 may further include a video display unit 1810 (e.g., a liquid crystal display (LCD) or a cathode ray tube (CRT)). The computer system 1800 also includes an alphanumeric input device 1812 (e.g., a keyboard), a user interface (UI) navigation (or cursor control) device 1814 (e.g., a mouse), a storage unit 1816, a signal generation device 1818 (e.g., a speaker) and a network interface device 1820.

The storage unit 1816 includes a machine-readable medium 1822 on which is stored one or more sets of data structures and instructions 1824 (e.g., software) embodying or utilized by any one or more of the methodologies or functions described herein. The instructions 1824 may also reside, completely or at least partially, within the main memory 1804 and/or within the processor 1802 during execution thereof by the computer system 1800, the main memory 1804 and the processor 1802 also constituting machine-readable media. The instructions 1824 may also reside, completely or at least partially, within the static memory 1806.

While the machine-readable medium 1822 is shown in an example embodiment to be a single medium, the term "machine-readable medium" may include a single medium or multiple media (e.g., a centralized or distributed database, and/or associated caches and servers) that store the one or more instructions 1824 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

Accordingly, a "tangible machine-readable medium" may refer to a single storage apparatus or device, as well as "cloud-based" storage systems or storage networks that include multiple storage apparatus or devices. Furthermore, the tangible machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The instructions 1824 may further be transmitted or received over a communications network 1826 using a transmission medium. The instructions 1824 may be transmitted using the network interface device 1820 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding or carrying instructions for execution by the machine, and includes digital or analog communications signals or other intangible media to facilitate communication of such software. The network 1826 may be one of the networks 104.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:
1. A system comprising:
one or more computer processors;
one or more computer memories; and a set of instructions incorporated into the one or more computer memories, the set of instructions configuring the one or more computer processors to perform operations comprising:

receiving a search query from a client device, the search query specifying a value of an attribute of an item listed on a network-based online marketplace;

searching a database of items listed on the network-based online marketplace, the searching including accessing an index for the database, the accessing of the index including accessing a first data representation, the first data representation including an identifier corresponding to the value of the attribute of the item that is present in the index, determining whether the identifier is present in the index, and based on a determination that the identifier is present in the index, accessing a second data representation, the second data representation including a blob of data corresponding to the identifier based on one or more variable length codes, wherein the blob of data comprises an array of bytes that interleaves bytes of a first data element of a plurality of non-contiguous data elements with one or more bytes of a second data element of the plurality of non-contiguous data elements;

generating a table based on accessing the second data representation, wherein the first data element of the plurality of non-contiguous data elements comprises an array of bytes that is included in the table that has been augmented with a plurality of continuation bits corresponding to each byte in the array of bytes;

communicating the generated table for display at the client device or a different device; and in response to the search query, communicating a result of the searching of the database for display at the client device, the result comprising a listing for the item on the network-based online marketplace corresponding to the blob of data.

2. The system of claim 1, wherein the one or more variable length codes comprise a plurality of non-contiguous data elements, and wherein accessing the second data representation comprises:

identifying a position of a first byte of a first data element of the one or more variable length codes based on the value of the attribute of the item; and accessing the first byte of the first data element at the identified position.

3. The system of claim 2, wherein the first data element of the plurality of non-contiguous data elements comprises an array of bytes that includes at least one string.

4. The system of claim 2, wherein the each of the plurality of non-contiguous data elements in the blob of data comprise one or more bytes that correspond to a respective identifier, and wherein the one or more bytes of each of the plurality of non-contiguous data elements in the blob of data are arranged in a non-contiguous order, a non-sequential order, or both.

5. The system of claim 1, wherein the accessing of the second data representation includes accessing a first byte of a first data element and accessing a continuation bit corresponding to the first byte to determine whether the first data element includes an additional byte.

6. The system of claim 5, wherein a location of the first byte is determined based on the accessing of the first data representation.

7. The system of claim 1, wherein the first data representation is a wavelet matrix or wavelet tree.

8. A method comprising:

receiving a search query from a client device, the search query specifying a value of an attribute of an item listed on a network-based online marketplace;

searching, by one or more computer processors, a database of items listed on the network-based online marketplace, the searching including accessing an index for the database, the accessing of the index including accessing a first data representation, the first data representation including an identifier corresponding to the value of the attribute of the item that is present in the index, determining whether the identifier is present in the index, and based on a determination that the identifier is present in the index, accessing a second data representation, the second data representation including a blob of data corresponding to the identifier based on one or more variable length codes, wherein the blob of data comprises an array of bytes that interleaves bytes of a first data element of a plurality of non-contiguous data elements with one or more bytes of a second data element of the plurality of non-contiguous data elements;

generating a table based on accessing the second data representation, wherein the first data element of the plurality of non-contiguous data elements comprises an array of bytes that is included in the table that has been augmented with a plurality of continuation bits corresponding to each byte in the array of bytes;

communicating the generated table for display at the client device or a different device; and in response to the search query, communicating a result of the searching of the database for display at the client device, the result comprising a listing for the item on the network-based online marketplace corresponding to the blob of data.

9. The method of claim 8, wherein the one or more variable length codes comprise a plurality of non-contiguous data elements, and wherein accessing the second data representation comprises:

identifying a position of a first byte of a first data element of the one or more variable length codes based on the value of the attribute of the item; and accessing the first byte of the first data element at the identified position.

10. The method of claim 9, wherein the first data element of the plurality of non-contiguous data elements comprises an array of bytes that includes at least one string.

11. The method of claim 8, wherein the accessing of the second data representation includes accessing a first byte of a first data element and accessing a continuation bit corresponding to the first byte to determine whether the first data element includes an additional byte.

12. The method of claim 11, wherein a location of the first byte is determined based on the accessing of the first data representation.

13. The method of claim 8, wherein the first data representation is a wavelet matrix or wavelet tree.

14. A non-transitory machine-readable medium comprising a set of instructions that, when executed by a processor, causes the processor to perform operations comprising:

receiving a search query from a client device, the search query specifying a value of an attribute of an item listed on a network-based online marketplace;

searching a database of items listed on the network-based online marketplace, the searching including accessing an index for the database, the accessing of the index including accessing a first data representation, the first data representation including an identifier corresponding to the value of the attribute of the item that is present in the index, determining whether the identifier is present in the index, and based on a determination that the identifier is present in the index, accessing a second data representation, the second data representation including a blob of data corresponding to the identifier based on one or more variable length codes, wherein the blob of data comprises an array of bytes that interleaves bytes of a first data element of a plurality of non-contiguous data elements with one or more bytes of a second data element of the plurality of non-contiguous data elements;

generating a table based on accessing the second data representation, wherein the first data element of the plurality of non-contiguous data elements comprises an array of bytes that is included in the table that has been augmented with a plurality of continuation bits corresponding to each byte in the array of bytes;

communicating the generated table for display at the client device or a different device; and in response to the search query, communicating a result of the searching of the database for display at the client device, the result comprising a listing for the item on the network-based online marketplace corresponding to the blob of data.

15. The non-transitory machine-readable medium of claim 14, wherein the one or more variable length codes comprise a plurality of non-contiguous data elements, and wherein accessing the second data representation comprises:

identifying a position of a first byte of a first data element of the one or more variable length codes based on the value of the attribute of the item; and accessing the first byte of the first data element at the identified position.

16. The non-transitory machine-readable medium of claim 15, wherein the first data element of the plurality of non-contiguous data elements comprises an array of bytes that includes at least one string.

17. The non-transitory machine-readable medium of claim 14, wherein the accessing of the second data representation includes accessing a first byte of a first data element and accessing a continuation bit corresponding to the first byte to determine whether the first data element includes an additional byte.

\* \* \* \* \*